United States Patent [19]
Sasse et al.

[11] Patent Number: 6,099,434
[45] Date of Patent: Aug. 8, 2000

[54] TORSIONAL VIBRATION DAMPER WITH AN AXIAL SECURING DEVICE

[75] Inventors: Christoph Sasse, Schweinfurt; Jörg Sudau, Niederwerrn; Wolfgang Kundermann, Schweinfurt, all of Germany

[73] Assignee: Mannesmann Sachs AG, Schweinfurt, Germany

[21] Appl. No.: 09/373,107

[22] Filed: Aug. 12, 1999

[30] Foreign Application Priority Data

Aug. 13, 1998 [DE] Germany .......................... 198 35 758

[51] Int. Cl.$^7$ ..................................................... F16F 15/12
[52] U.S. Cl. ........................... 475/347; 192/30 V; 74/574
[58] Field of Search ............................... 74/574; 475/347; 192/30 V, 3–29, 212

[56] References Cited

U.S. PATENT DOCUMENTS 5,944,610  8/1999  Sudau ........................................ 192/212
6,003,650  12/1999  Kleifges ................................... 475/347

FOREIGN PATENT DOCUMENTS

3021189 C2  1/1990  Germany .

*Primary Examiner*—Dirk Wright
*Attorney, Agent, or Firm*—Cohen, Pontani, Lieberman & Pavane

[57] ABSTRACT

A torsional vibration damper for a lockup clutch of a hydrodynamic torque converter is provided with a drive-side damper element which is in operative connection with energy accumulators of a damping device and is provided with a driven-side damper element serving to support the energy accumulators in the circumferential direction. The individual energy accumulators are connected with one another by sliding elements which are movable in the circumferential direction along a guide path. The guide path is accommodated at one of the damper elements and a securing device for securing against axial movements of the sliding elements is associated with the guide path. This securing device is formed at the side of the guide path which faces the sliding elements and has a positive engagement with at least one of the sliding elements.

10 Claims, 5 Drawing Sheets

TORSIONAL VIBRATION DAMPER WITH AN AXIAL SECURING DEVICE

BACKGROUND OF THE INVENTION

1. Field of the Invention

The invention relates to torsional vibration dampers, and more particularly, to a torsional vibration damper having an axial securing device.

2. Description of the Related Art

A torsional vibration damper for a lockup clutch of a hydrodynamic torque converter is known from DE 30 21 189 C2, particularly from FIGS. 4 and 5 and the associated description. The lockup clutch has a piston which can be brought into operative connection with a drive-side radial flange of the converter housing via a friction facing. A drive-side damper element of the torsional vibration damper is fastened to the piston and acts, with inwardly directed radial projections, as a control element for energy accumulators of a damping device of the torsional vibration damper. On the driven side, the energy accumulators are supported at a hub disk which acts as a driven-side damper element, and which is connected with a turbine wheel so as to be fixed with respect to rotation relative to it. The above-mentioned energy accumulators are interconnected by sliding elements which are movable in the circumferential direction along a guide path formed at the drive-side damper element. This damper element acts as a device for securing against axial movements of the energy accumulators and of the sliding elements by means of the above-mentioned radial projections of this damper element which closely and axially enclose the energy accumulators.

This type of construction of the drive-side damper element has a relatively complicated shape because it must be curved such that the radial projections serve as control elements for the energy accumulators at determined circumferential intervals, but serve at other circumferential intervals as a guide path for the sliding elements and also as an axial securing device. Accordingly, the drive-side damper element is comparatively complicated and uneconomical to manufacture, so that production costs are high.

SUMMARY OF THE INVENTION

It is an object of the invention to develop a torsional vibration damper such that it takes over the radial guidance and also the axial guidance of elements of the damping device in the simplest possible construction.

According to the invention, the securing device is constructed at that side of the guide path of the drive-side damper element associated with the sliding elements, resulting in an axially acting positive engagement formed at the immediate radial point of contact of the sliding elements at this guide path. Therefore, the sliding elements are permitted the desired movability relative to the guide path in the circumferential direction, but relative movability is prohibited in the axial direction. Since a positive engagement of this kind can be formed in a simple manner in that a radial projection is provided at one of the structural component parts—the guide path or sliding element—and a corresponding radial depression is provided at the other respective structural component part in which the above mentioned radial projection engages. For this purpose, the radial projection can be formed either by a radial formed-out portion at the guide path or by a radial formed-on portion at the sliding element. But both structural component parts are also suitable for receiving the radial formed-out portion or the radial formed-on portion in the shape of the radial depression.

In a preferred embodiment, the guide path for the sliding elements is formed at the radial inner side of a circumferential ring which is fastened to the turbine wheel. Another advantageous embodiment consists in that a planetary gear set is associated with the lockup clutch, which has proven particularly effective for at least partial suppression of interfering frequencies in torsional vibration dampers, especially in hydrodynamic torque converters.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings wherein like reference numerals denote similar elements throughout the several views.

DETAILED DESCRIPTION OF THE PRESENTLY PREFERRED EMBODIMENTS

Figure 1:
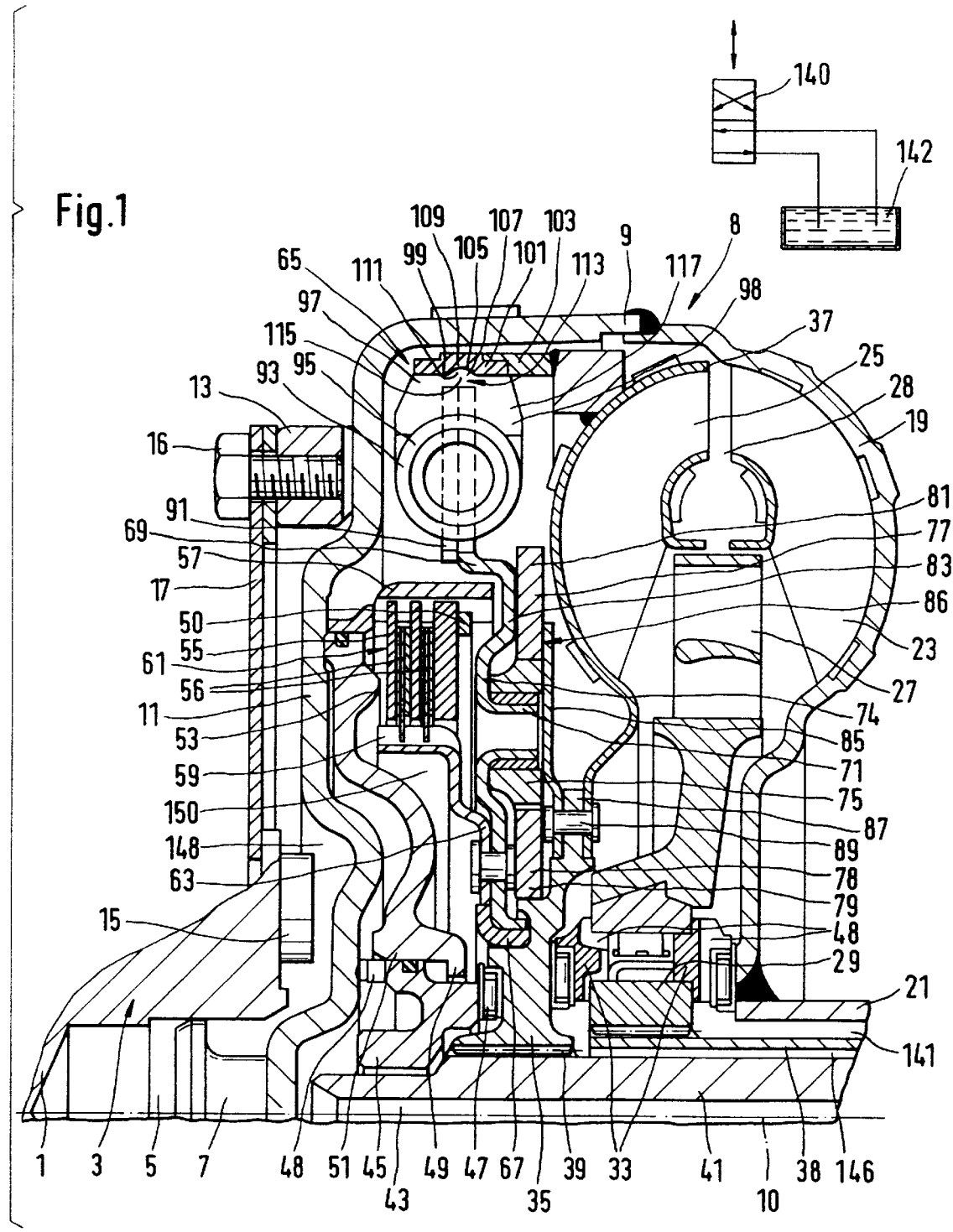
FIG. 1 is a sectional view of a hydrodynamic torque converter with a torsional vibration damper and a lockup clutch with a lamination stack and a planetary gear set.

FIG. 1 shows a hydrodynamic torque converter 8 which is fastened to a drive 3 in the form of a crankshaft 1 of an internal combustion engine. The crankshaft 1 has a central recess 5 in which is inserted a bearing journal 7 that is fastened to a radial flange 11 of the converter housing 9, which radial flange 11 extends outward from a center axis 10. Fastening blocks 13 are provided in the radial outer area of the radial flange 11, and include threaded bore holes for the engagement of a screw connection 16. A plate 17, which is flexible in the axial direction, is held by means of this screw connection 16, and farther radially inward allows the plate 17 to be fastened to the crankshaft 1 by means of a screw connection 15.

In addition, the converter housing 9 has a pump bowl or shell 19 to which a housing hub 21 is fastened in the radial inner area. Together with a vane arrangement, the pump shell 19 forms an impeller wheel 23. In addition to the vane arrangement, a turbine wheel 25 having a turbine shell 37 and a turbine hub 35 is associated with this impeller wheel 23. A stator wheel 27 is provided axially between the impeller wheel 23 and the turbine wheel 25 which, together with the above-mentioned wheels 23 and 25, forms the hydrodynamic circuit 28. The stator wheel 27 is arranged on a freewheel 29 which is arranged between two axial bearings 33, wherein each of these axial bearings 33 is formed with a passage 48 for hydraulic fluid. This hydraulic fluid proceeds from a supply reservoir 142 and is conducted via a control valve 140 to annular channels 144 and 146, the first of which extends radially between the housing hub 21 and a sleeve 38 connected with the freewheel 29 via a toothing, while the other extends radially between the sleeve 38 and a driven shaft 41 which is rotatable about the center axis 10 and serves as a transmission input shaft. This driven shaft 41 is connected, via a toothing 39, with the turbine hub 35 so as to be fixed with respect to rotation relative to it.

The turbine hub 35 is supported in the axial direction by one of the axial bearings 33 at the freewheel 29 which, in turn, contacts the impeller shell 19 via the other axial bearing 33. The turbine hub 35 is supported on the other axial side by means of an axial bearing 47 at a housing hub 45 which is fastened to the radial flange 11. The housing hub has a passage 48 for hydraulic fluid which can be delivered, via a center bore hole 43 of the driven shaft 41, into a chamber 148 which is located axially between the radial flange 11 and a piston 51 of a lockup clutch 61. The piston 51 is supported on the housing hub 45 so as to be axially movable. A chamber 150 which is in working connection with the hydrodynamic circuit 28 is located on the opposite side of the piston 51. The piston 51 is received via a toothing 49 at the housing hub 45 so as to be fixed with respect to rotation relative to it and, in the event that an overpressure is built up in the chamber 148, can be brought into contact with an axial projection 53 at a lamination stack 55 having friction facings 56. In order to build up overpressure in chamber 148, the control valve 140 is switched in such a way that hydraulic fluid flows out of the reservoir 142 via the center bore hole 43 in the driven shaft 41, and via passage 48 at the housing hub 45 into the chamber 148. As a result of this overpressure, the piston 51 moves in the direction of the lamination stack 55 and, due to the fact that the stack is supported at an axial securing disk 50, results in a frictional engagement of the individual laminations by the friction facings 56. Thus, the movement of the converter housing 9, and consequently that of a driving part 57 of the lockup clutch 61 is conducted to a driven part 59 which is fastened to a driven-side damper element 63 of a torsional vibration damper 65. The driving part 57 is connected with the converter housing 9 so as to be fixed with respect to rotation relative to it. The driven-side damper element 63 which is constructed as a hub disk 69 is received in a bearing dish 67 of the turbine hub 35 and has, in the radial central area, an axial pressed out portion 71 in the direction of the adjacent turbine wheel 25. This axial pressed out portion 71 acts as a bearing for a planet gear 75 of a planetary gear set 77. Of course, a plurality of planet gears 75 can be received at the hub disk 69 so that the latter acts as a planetary carrier 74.

The planet gear 75 is in operative connection, via its toothing, with a gear unit element 78 in the form of a sun gear 79 which is fastened to the turbine hub 35 by means of a weld. A ring gear 81 of the planetary gear set 77 is mounted in a floating manner in the circumferential direction and engages in the radial outer area of the planet gear 75. In the axial direction, however, the ring gear 81 as well as the planet gear 75 are secured on the one hand by a bulge 83 at the planetary carrier 74 and, on the other hand, by a holder 85 which is connected with a radial projection 87 at the turbine hub 35 by means of a rivet connection 89 which serves to connect the turbine shell 37 with the turbine hub 35. Accordingly, axial securing means 86 for gear unit elements of the planetary gear set 77 are formed by means of the planetary carrier 74 via its bulge 83 in connection with the holder 85.

The hub disk 69 has a radially projecting, driven-side control element 91 in its radial outer area for elastic elements 93 serving as energy accumulations of a damping device 95 of the torsional vibration damper 65 which extend in the circumferential direction. The elastic elements 93 are connected with one another via sliding elements 97 and can also be supported circumferentially by means of such sliding elements at the driven-side control element 91 and at drive-side control elements 98. The drive-side control elements 98 are constructed in the form of radial projections 117 at a circumferential ring 101 which is fastened to the turbine wheel 25 via a holding clip 103, and a guide path 99 for the sliding elements 97 is provided at the radial inner side of the circumferential ring 101. A depression 105 extends in the circumferential ring 101 in the area of extension of this guide path 99, wherein a corresponding radial projection 107 engages radially in at least one of the sliding elements 97 in the circumferential ring 101. In this respect, the depression 105 in the circumferential ring 101 serves as a radial formed-out portion 109 and the radial projection 107 in the sliding elements 97 serves as a radial formed-on portion 111. This results in a positive engagement 115 and therefore in an axially acting securing device 113 of the sliding elements 97 and accordingly of the elastic elements 93 relative to the circumferential ring 101 and consequently relative to the turbine wheel 25. Secured in this way against movements in the axial direction, the sliding elements 97 are capable of continuing their movement unimpeded in the circumferential direction when torque shocks are introduced.

With respect to the torsional vibration damper 65, the circumferential ring 101 serves as a drive-side damper element 116.

Figure 2:
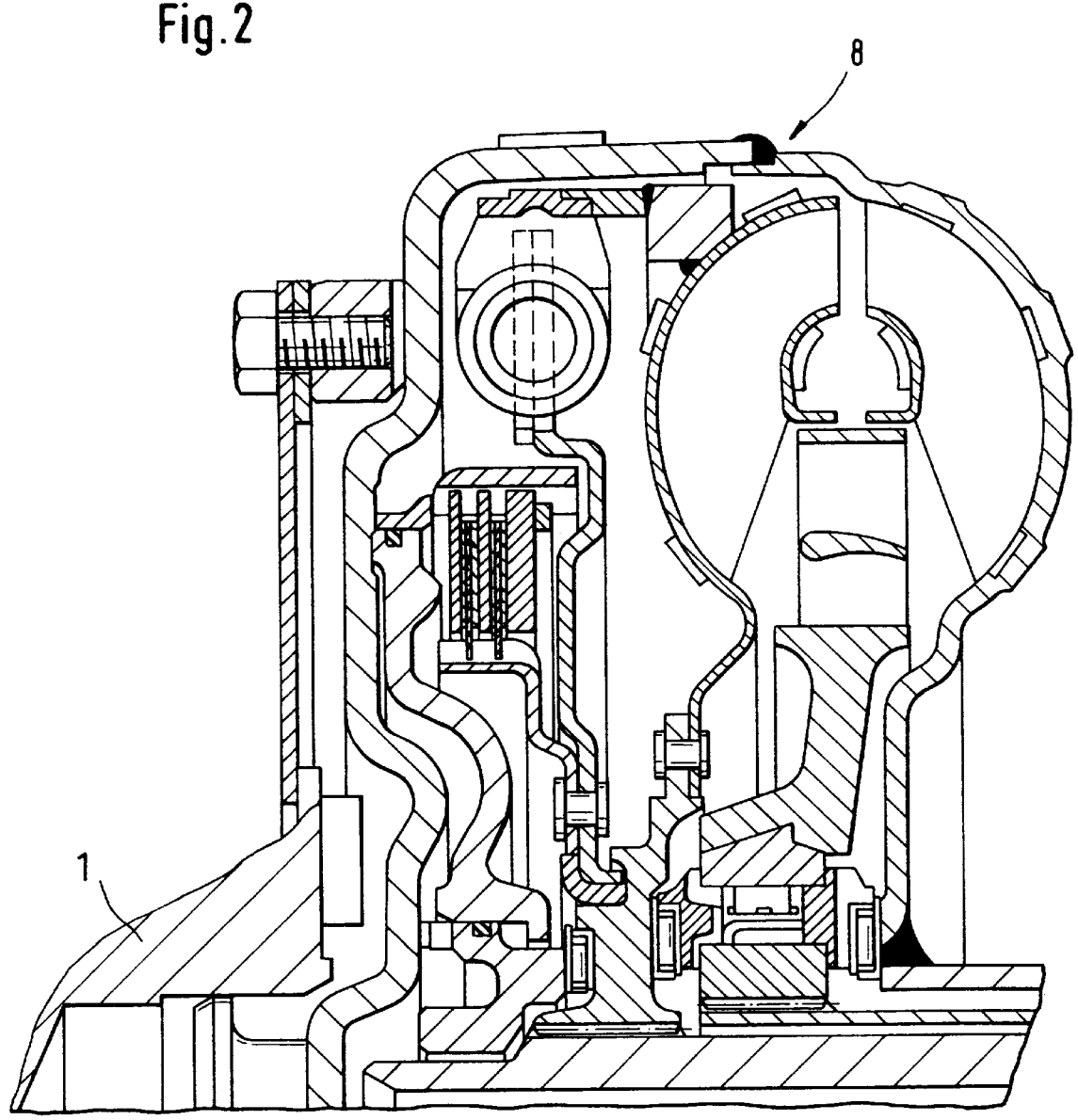
FIG. 2 is the hydrodynamic torque converter shown in FIG. 1 without the planetary gear set.

The torsional vibration damper in FIG. 2 corresponds to that of FIG. 1, but has no planetary gear set 77.

Figure 3:
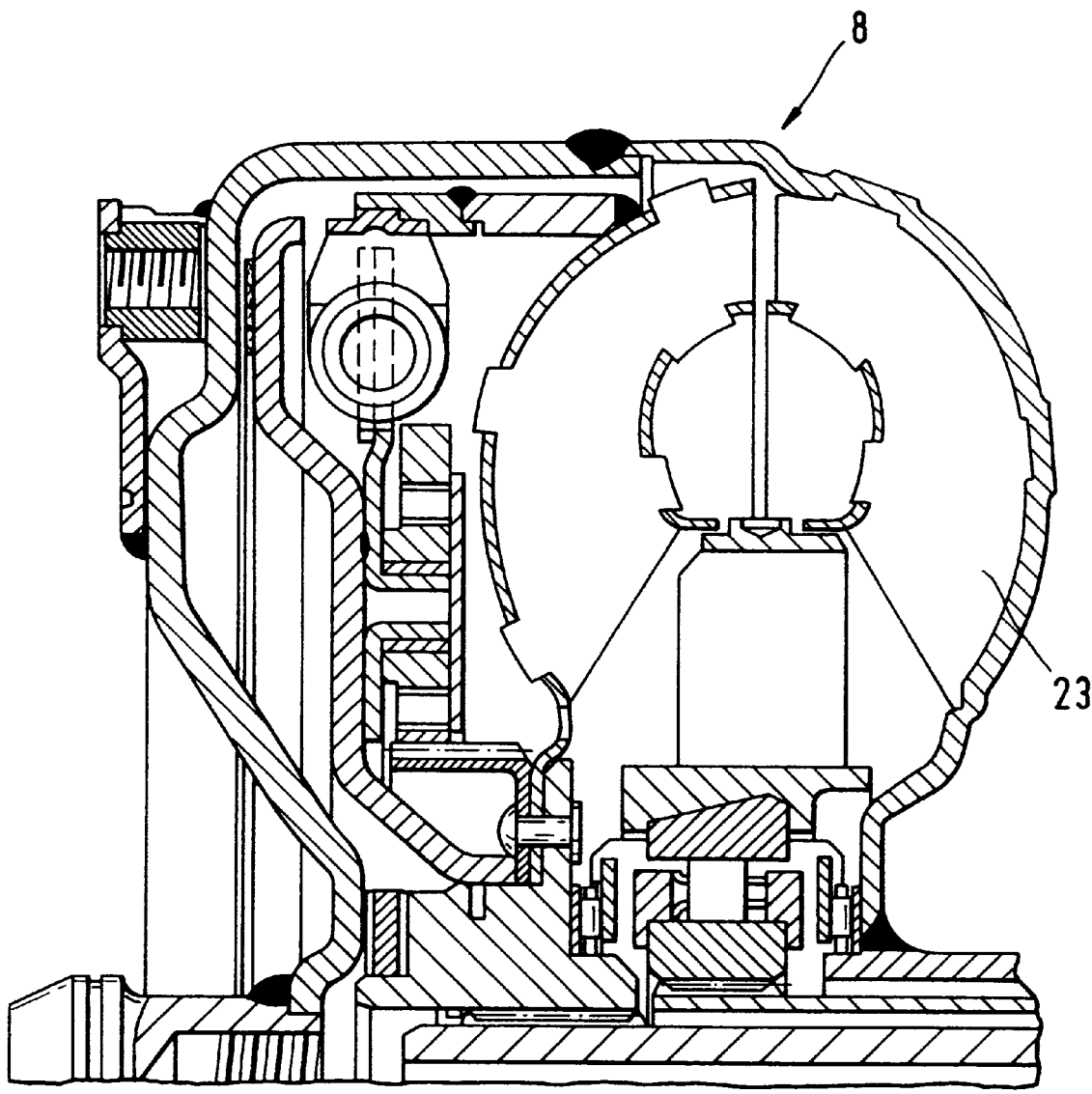
FIG. 3 is the hydrodynamic torque converter shown in FIG. 1 having only one friction facing between a piston of the lockup clutch and a converter housing.

In FIG. 3, an individual friction facing 119 is provided instead of a stack of laminations at the piston 51, wherein the friction facing 119 can be brought into contact with a corresponding friction surface at the radial flange 11 of the converter housing 9. In this embodiment, the sun gear 79 of the planetary gear set 77 connected with the piston 51 of the lockup clutch 61 is joined via a clip 121 with the turbine wheel 25 by way of the turbine hub 35 of the latter so as to be fixed with respect to rotation relative to the turbine wheel 25.

Figure 4:
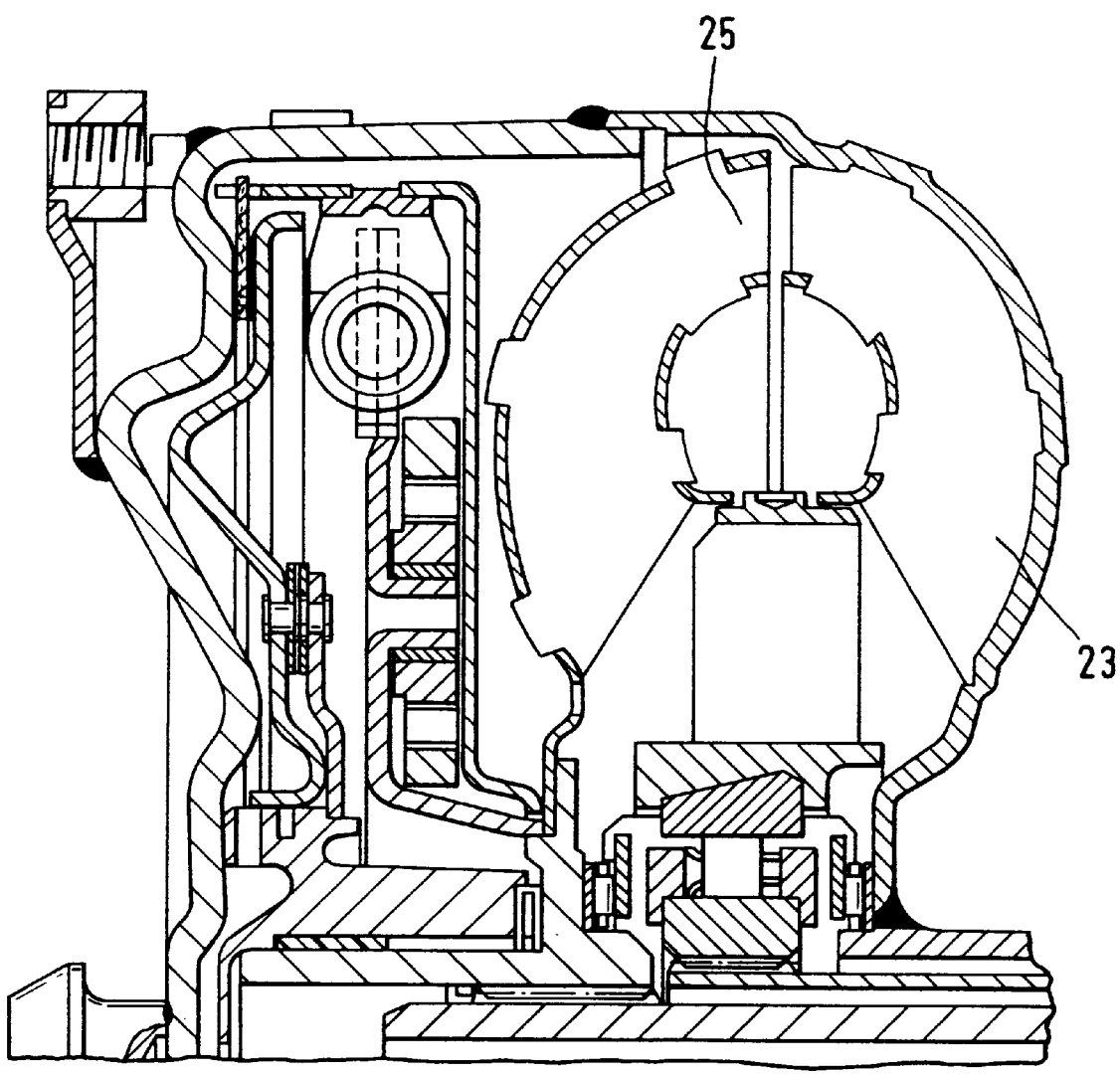
FIG. 4 is the hydrodynamic torque converter shown in FIG. 1 having a disk with two friction facings axially between the piston of the lockup clutch and the converter housing.

FIG. 4 shows another embodiment according to the invention in which the torsional vibration damper 65 is connected so as to be fixed with respect to relative rotation with a disk or lamination 123 which is axially displaceable between the radial flange 11 of the converter housing 9 and the piston 51 of the lockup clutch 61 and which carries friction facings 125 and 127. The connection is produced by a toothed ring 129 which is connected with the lamination 123 so as to be fixed with respect to rotation relative to it by means of a positive engagement and which is fixedly connected with the circumferential ring 101 by means of a weld. Proceeding from the other axial side, the circumferential ring 101 is connected with the turbine wheel 25 so as to be axially secured by the holder 85.

Figure 5:
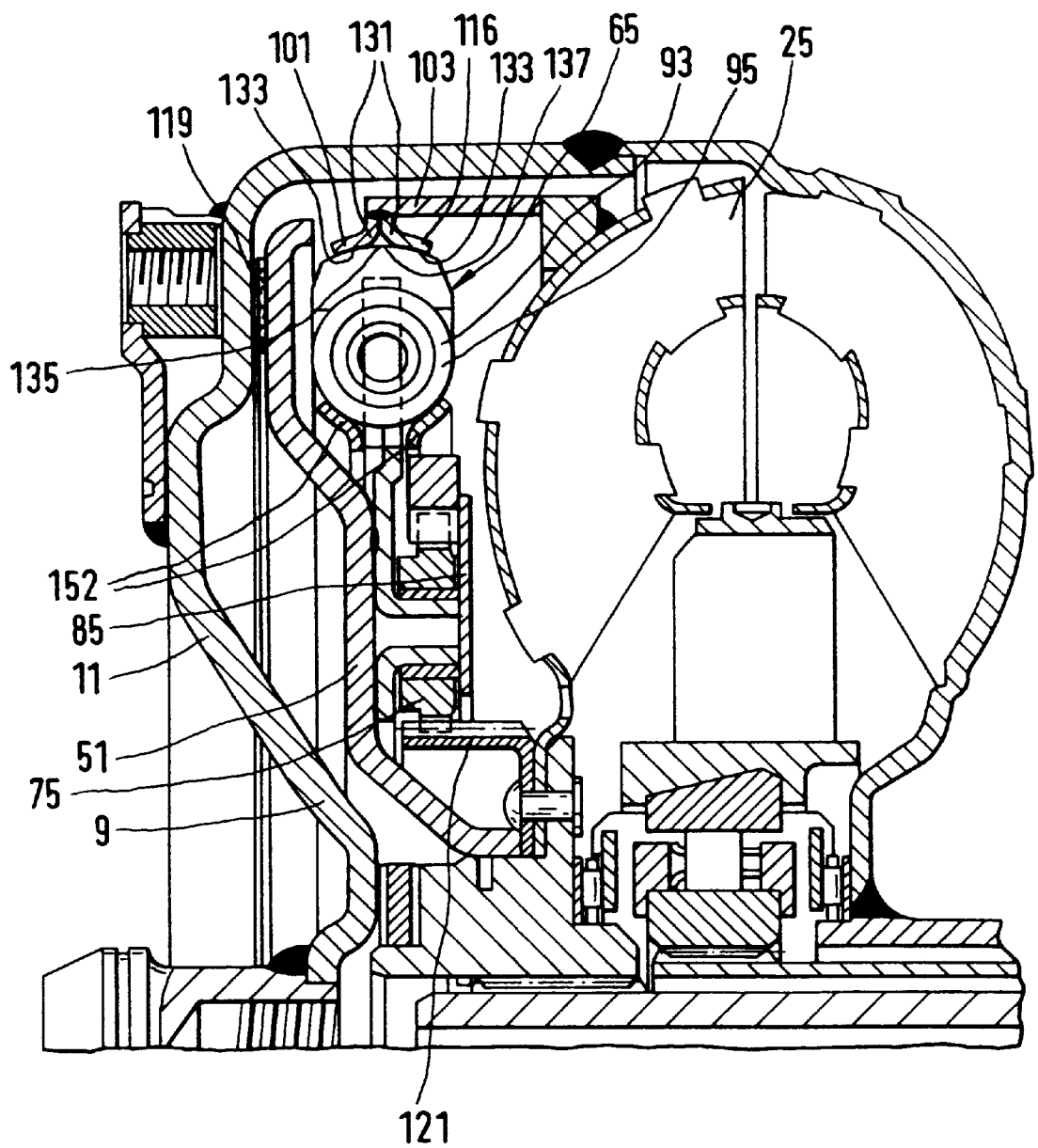
FIG. 5 is the hydrodynamic torque converter shown in FIG. 1 showing another embodiment of the guide path for sliding elements of a damping device of the torsional vibration damper.

Another embodiment of the circumferential ring 101 is shown in FIG. 5, in which plates 131 are fastened to the holding clip 103 and are curved apart in axially opposite directions and provided with a curvature 133 at their radial inner sides, which curvature 133 is associated with a curvature 135 at the outer side 137 of the sliding elements 97. Due to the contact surface along the two curvatures 133 and 135, the sliding elements 97 are secured in the axial direction against relative movements relative to the circumferential ring 101. Further more, holders 152 are provided at the drive-side damper element 116 for axially securing the elastic elements 93 of the damping device 95.

The invention is not limited by the embodiments described above which are presented as examples only but can be modified in various ways within the scope of protection defined by the appended patent claims.

We claim:

1. A torsional vibration damper for a lockup clutch of a hydrodynamic torque converter comprising:

a damping device having energy accumulators;

a drive-side damper element in operative connection with the energy accumulators;

a driven-side damper element supporting the energy accumulators in a circumferential direction;

a guide path for connecting individual energy accumulators with one another;

a plurality of sliding elements movable in a circumferential direction along said guide path; and a securing device formed at a side of said guide path facing said sliding elements and associated with said guide path for securing said sliding elements against axial movement, said securing device being in positive engagement with at least one of said plurality of sliding elements.

2. The torsional vibration damper in accordance with claim 1, wherein said securing device comprises at least one radial formed-out portion, and a corresponding formed-on portion, said at least one radial formed-out portion being in radial engagement with said formed-on portion at a respective sliding element.

3. The torsional vibration damper in accordance with claim 2, wherein said radial formed-out portion comprises a circumferential depression, and at least one of said plurality of sliding elements comprises a radial projection, wherein said radial projection engages said circumferential depression and serves as said radial formed on portion.

4. The torsional vibration damper in accordance with claim 1, further comprising a circumferential ring fastened to a turbine wheel of the torque converter and having radial projections extending inward acting as drive-side control elements for the energy accumulators of the damping device.

5. The torsional vibration damper in accordance with claim 1, further comprising:

a planetary gear set having at least one planet gear and an additional gear unit element fastened to a turbine hub of the torque converter, said hub disk acting as a planetary carrier for said at least one planet gear, wherein said driven-side damper element comprises a hub disk having a driven-side control element for the energy accumulators.

6. The torsional vibration damper in accordance with claim 5, wherein said additional gear unit element comprises a sun gear.

7. The torsional vibration damper in accordance with claim 5, wherein said planetary gear set further comprises an axially secured ring gear movable in a circumferential direction, said planet gear being in meshing engagement with said ring gear.

8. The torsional vibration damper in accordance with claim 7, further comprising:

an axial securing means formed by said planetary carrier; and a holder axially supported at the turbine wheel for at least a portion of said planet gear and said ring gear.

9. The torsional vibration damper in accordance with claim 8, further comprising an axially displaceable lamination connected with said guide path and said holder in a rotationally fixed manner, said lamination being provided axially between a converter housing and a piston, and brought into frictional connection with the converter housing and piston via friction facings.

10. The torsional vibration damper in accordance with claim 2, wherein said radial formed-out portion comprises two plates axially bent in opposite directions and having a curvature at their side facing said sliding elements, wherein said sliding elements further comprise radial outer sides having a corresponding curvature acting as a radial formed-on portion at the sliding elements, said curvature of the plates at least partially engaging around a said corresponding curvature of the plates.

\* \* \* \* \*